United States Patent [19]

Broad

[11] 4,334,996
[45] Jun. 15, 1982

[54] TUBE PRESSURE FILTERS

[75] Inventor: Bernard H. Broad, St. Austell, England

[73] Assignee: English Clays Lovering Pochin & Co. Limited, Cornwall, England

[21] Appl. No.: 97,934

[22] Filed: Nov. 26, 1979

Related U.S. Application Data

[63] Continuation of Ser. No. 924,802, Jul. 14, 1978, abandoned, which is a continuation of Ser. No. 748,188, Dec. 7, 1976, abandoned.

[30] Foreign Application Priority Data

Dec. 18, 1975 [GB] United Kingdom ............... 51974/75

[51] Int. Cl.³ .......................... B01D 25/12; B30B 9/06
[52] U.S. Cl. .................................. 210/350; 100/112; 100/211; 210/351
[58] Field of Search ................ 100/112, 211; 210/117, 210/350, 351, 136

[56] References Cited

U.S. PATENT DOCUMENTS

| | | | |
|---|---|---|---|
| 1,847,068 | 3/1932 | Campbell | 210/117 X |
| 1,960,335 | 5/1934 | Finnie et al. | 210/116 |
| 2,526,656 | 10/1950 | Goetz | 210/117 |
| 2,630,920 | 3/1953 | Kew | 210/117 |
| 3,712,209 | 1/1973 | Gwilliam | 210/350 |
| 3,713,382 | 1/1973 | Gwilliam | 210/350 |
| 3,753,499 | 8/1973 | Gwilliam | 210/350 |
| 3,756,102 | 9/1973 | Gwilliam | 100/112 |
| 3,805,961 | 4/1974 | Clark et al. | 100/112 |
| 3,900,403 | 8/1975 | Randle et al. | 210/350 |
| 3,974,074 | 8/1976 | Purdy | 210/350 |

FOREIGN PATENT DOCUMENTS 244142 12/1960 Australia ............................ 210/351

*Primary Examiner*—Benoît Castel
*Attorney, Agent, or Firm*—Larson & Taylor

[57] ABSTRACT

A tube pressure filter including an inner compartment having an inlet which comprises a substantially annular aperture extending around the lower end of the inner tubular body and debouching into the inner compartment. The substantially annular aperture is constructed and disposed so that, in use, feed material debouching therefrom has an upward component of velocity and is in communication with an ante-chamber into which a mixture to be pressure filtered can be introduced under pressure through a feed conduit, the feed conduit containing or co-operating with a non-return valve so as to prevent the flow back along the feed conduit of feed material to be pressure filtered which is under high pressure.

7 Claims, 2 Drawing Figures

TUBE PRESSURE FILTERS

This is a continuation of application Ser. No. 924,802 filed July 14, 1978 which, in turn, is a continuation of aplication Ser. No. 748,188, filed on Dec. 7, 1976, both now abandoned.

BACKGROUND OF THE INVENTION

This invention relates to pressure filters for separating liquids and particulate solids. More particularly, the invention is concerned with tube pressure filters of the kind which comprise (a) a pair of generally coaxial tubular bodies arranged one within the other and adapted to be supported in a generally upright position, (b) an impermeable elastic sleeve disposed within and secured to the outer tubular body, (c) a filter element disposed around and supported by the inner tubular body, (d) outlet means for the discharge of filtrate which has passed through the filter element and (e) means for displacing the tubular bodies axially relative to one another between first and second positions, the arrangement being such that in the first position of said tubular bodies they co-operate with each other to define a closed annular chamber which is divided into generally coaxial and non-intercommunicating inner and outer compartments by said impermeable elastic sleeve, the inner compartment having an inlet for feed material comprising a mixture of liquid and particulate solid material and the outer compartment having an inlet for a hydraulic fluid under pressure, and in the second position of said tubular bodies said annular chamber is open to enable particulate solid material to be discharged from the inner compartment. Hereinafter a tube pressure filter of this kind will be referred to as "a tube pressure filter of the kind set forth". Further details of the construction and operation of tube pressure filters of the kind set forth are given in, for example, British Patent Specification Nos. 907,485; 1,240,465; 1,240,466; 1,317,887; 1,340,858; 1,351,142; 1,351,943; 1,355,334; 1,336,856; 1,362,655; and 1,386,256.

When a tube pressure filter of the kind set forth is to be used, there is usually established a filtration cycle in which the tubular bodies are moved to their first position and feed material to be pressure filtered (in the form of a slurry comprising a mixture of liquid and particulate solid) is fed into the inner compartment through the inlet of the latter, and hydraulic fluid is introduced into the outer compartment through the inlet of the latter. The pressure exerted by the hydraulic fluid is increased and this causes filtrate, i.e. liquid, to be expressed through pores in the filter element, and a filter cake of the particulate solid material to be built up on the outer surface of the filter element. The filtrate is discharged from the tube pressure filter through the outlet means provided therefor. The hydraulic fluid is then withdrawn from the outer compartment, and the tubular bodies are moved to their second position whereupon the filter cake can be discharged from the inner compartment. The tubular bodies are then returned to their first position and the filtration cycle can be repeated.

There have been described various arrangements whereby the feed material to be pressure filtered can be fed into the inner compartment of a tube pressure filter of the kind set forth. In one arrangement, the inlet of the inner compartment comprises a plurality of apertures distributed around the lower end of the inner tubular body whereby feed material can be fed into the inner compartment uniformly around the bottom thereof. Advantageously, these apertures communicate with an antechamber into which the feed material to be pressure filtered can be introduced under pressure through a feed conduit. The apertures are in the form of slots and are normally closed by a ring of elastomeric material which is conveniently of rectangular or L-shaped cross-section and which is disposed around the outside of the inner tubular body and acts as a non-return valve, the feed material being forced past the ring of elastomeric material during the introduction of the feed material into the inner compartment and being prevented by the ring of elastomeric material from returning to the ante-chamber during the pressure filtration. It has been found from practical experience that problems may arise with the arrangement described above; firstly during discharge of the filter cake there is a tendency for the feed material which is to be pressure filtered to leak around the ring of elastomeric material; and secondly, during pressure filtration the ring of elastomeric material tends to be drawn or forced into the apertures forming the inlet to the inner compartment with consequent risk of damage to and failure of the elastomeric ring.

SUMMARY OF THE INVENTION

According to the present invention there is provided a tube pressure filter of the kind set forth wherein the inlet of the inner compartment comprises a substantially annular aperture extending around the lower end of the inner tubular body and debouching into the inner compartment, said substantially annular aperture (a) being constructed and disposed so that, in use, feed material debouching therefrom has an upward component of velocity and (b) being in communication with an antechamber into which a mixture to be pressure filtered can be introduced under pressure through a feed conduit, and wherein said feed conduit contains or co-operates with a non-return valve so as to prevent the flow back along the feed conduit of feed material to be pressure filtered which is under high pressure.

With a tube pressure filter of the present invention there is usually no need to have an elastomeric ring to close the substantially annular aperture at the lower end of the inner tubular body.

The substantially annular aperture has a width such that it is not so small that the feed material cannot be introduced quickly enough nor so large that the impermeable elastic sleeve dividing the annular chamber into the inner and outer compartments is extruded into the aperture and damaged. It has been found that generally the substantially annular aperture should have a width which is not larger than 3.0 mm nor smaller than 0.50 mm. Preferably the substantially annular aperture has a width not larger than 1.50 mm and most preferably has a width in the range of from 0.50 to 1.25 mm.

Advantageously the substantially annular aperture is disposed so that it is higher than the roof of the ante-chamber and communicates with the ante-chamber by way of a substantially toroidal chamber which is disposed at a lower level than said annular aperture, encircles the ante-chamber, and is connected thereto by a plurality of ducts. The substantially toroidal chamber distributes the feed material evenly around the annular aperture. The ducts connecting the substantially toroidal chamber with the ante-chamber are preferably, but not essentially, spaced substantially uniformly. The total cross sectional area of all the ducts is preferably approximately equal to the total cross section area of the annular aperture. For example, if the diameter of the annular aperture is 221 mm and the width of the annular aperture is 0.76 mm, the total cross-sectional area of the annular aperture is 528 mm$^2$. A convenient diameter for the ducts is 4.75 mm, and therefore the number of ducts of this diameter required to provide the same total cross-sectional area as that of the annular aperture is 30. The annular aperture is preferably located so that in use it is higher than the roof of the ante-chamber in order that the feed material may drain back into the ante-chamber during pressure filtration and discharge of the filter cake and in order that during the introduction of the feed material into the inner compartment of the tube pressure filter it may emerge from the annular aperture with an upward component of velocity. The ducts connecting the substantially toroidal chamber with the ante-chamber will generally be inclined downwardly from the toroidal chamber so that again any feed material in the toroidal chamber will tend to drain back into the ante-chamber.

In one form of tube pressure filter of the kind set forth which has been found to give satisfactory results, the generally coaxial tubular bodies each comprise a cylindrical central section, and upper and lower end sections adapted to co-operate with the adjacent end sections of the other tubular body to form a seal when the tubular bodies are in their first position. The filter element is disposed around the central cylindrical section of the inner tubular body. Each of the end sections of the inner tubular body includes a cap, which is of a larger external diameter than the central cylindrical section, and a fairing mounted on or adjacent to said cap so as to extend around the immediately adjacent portions of said central cylindrical section, the end sections of the inner tubular body being adapted to co-operate with adjacent end sections of the outer tubular body to form a seal therewith when said tubular bodies are in their first position. When applying the present invention to this latter form of tube pressure filter, the arrangement is preferably such that the substantially annular aperture is disposed relative to the impermeable elastic sleeve so that, in use, the feed material debouching from the annular aperture is constrained by the impermeable elastic sleeve to flow upwards at high velocity over the outer face of the fairing mounted on or adjacent to the cap of the lower end section of the inner tubular body. In this way, during the early stages of a filtration cycle the fairing is scoured clean of any filter cake deposited on it in a previous filtration cycle.

The non-return valve is preferably contained in the feed conduit at a position which is outside the tubular bodies constituting the main structure of the tube pressure filter; this facilitates servicing of the non-return valve. In some embodiments of the present invention the non-return valve is located in the feed conduit at a position where the feed flows downwardly, and in these embodiments the non-return valve advantageously comprises (a) biasing means which close the non-return valve when the pressure on the upstream side is reduced substantially to zero, and (b) guide means which serve to locate the valve members of the non-return valve accurately in the closed position. The biasing means can be, for example, a helical spring which is conveniently made of a corrosion resistant material and which is located on the downstream side of the valve. The guide means conveniently comprises an elongate portion having a cross section in the shape of a star with three, four or more points, which elongate portion slides in a straight portion of the feed conduit on the upstream or downstream side of the valve. In other embodiments, the non-return valve is located in the feed conduit at a position where the feed flows upwardly and in these embodiments it may take the form of, for example, a ball valve. In such a location the ball of the ball valve will drop under gravity on its seat as soon as the feed pressure falls substantially to zero and no guide means or biasing means is necessary.

During operation of tube pressure filters of the kind set forth, there is generated in the inner compartment a very high pressure, for example there may be generated a pressure in excess of 1500 pounds per square inch gauge (p.si.g.), and therefore pressures of this order may be transmitted to the feed conduit during a filtration cycle. It is therefore necessary for the non-return valve to be constructed so as to be capable of withstanding such pressures when it is closed.

DESCRIPTION OF PREFERRED EMBODIMENT

Figure 1:
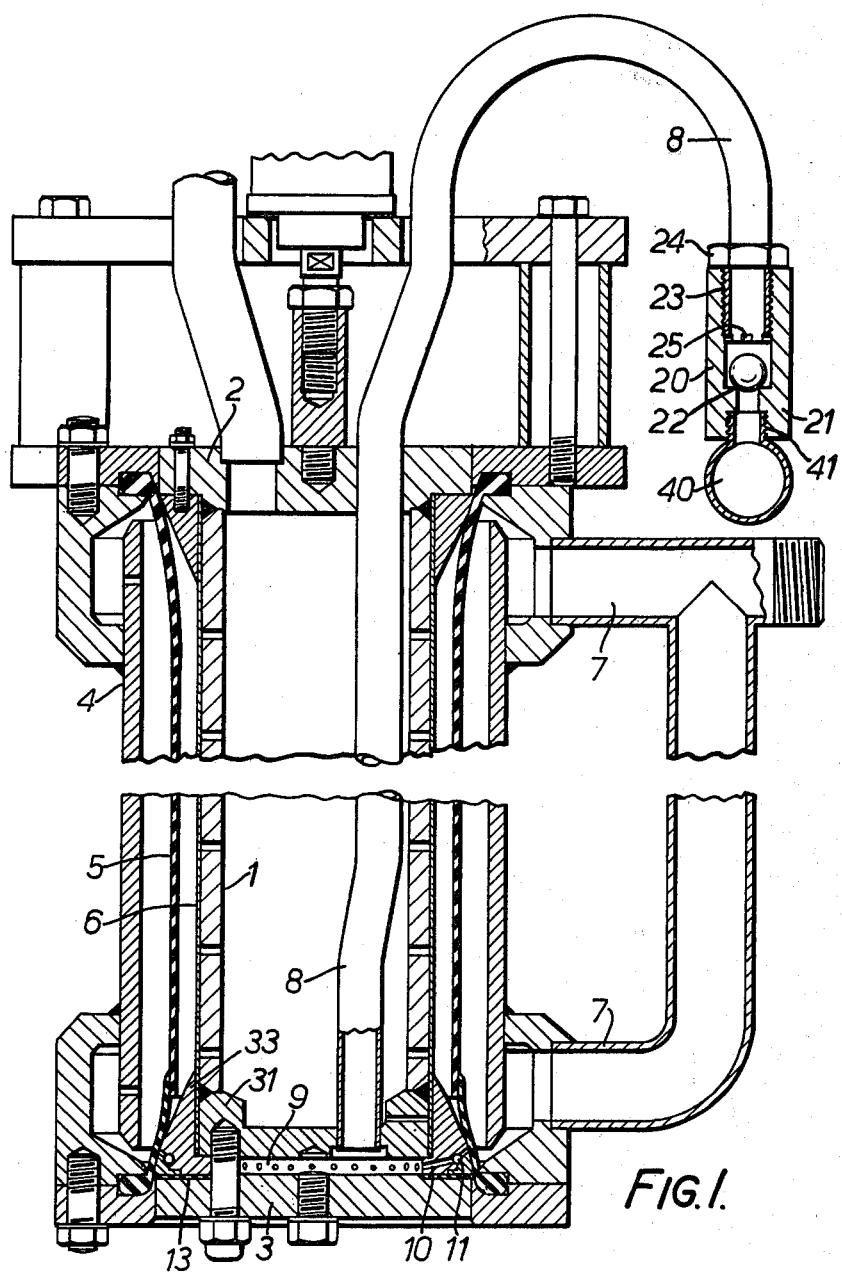
Figure 2:
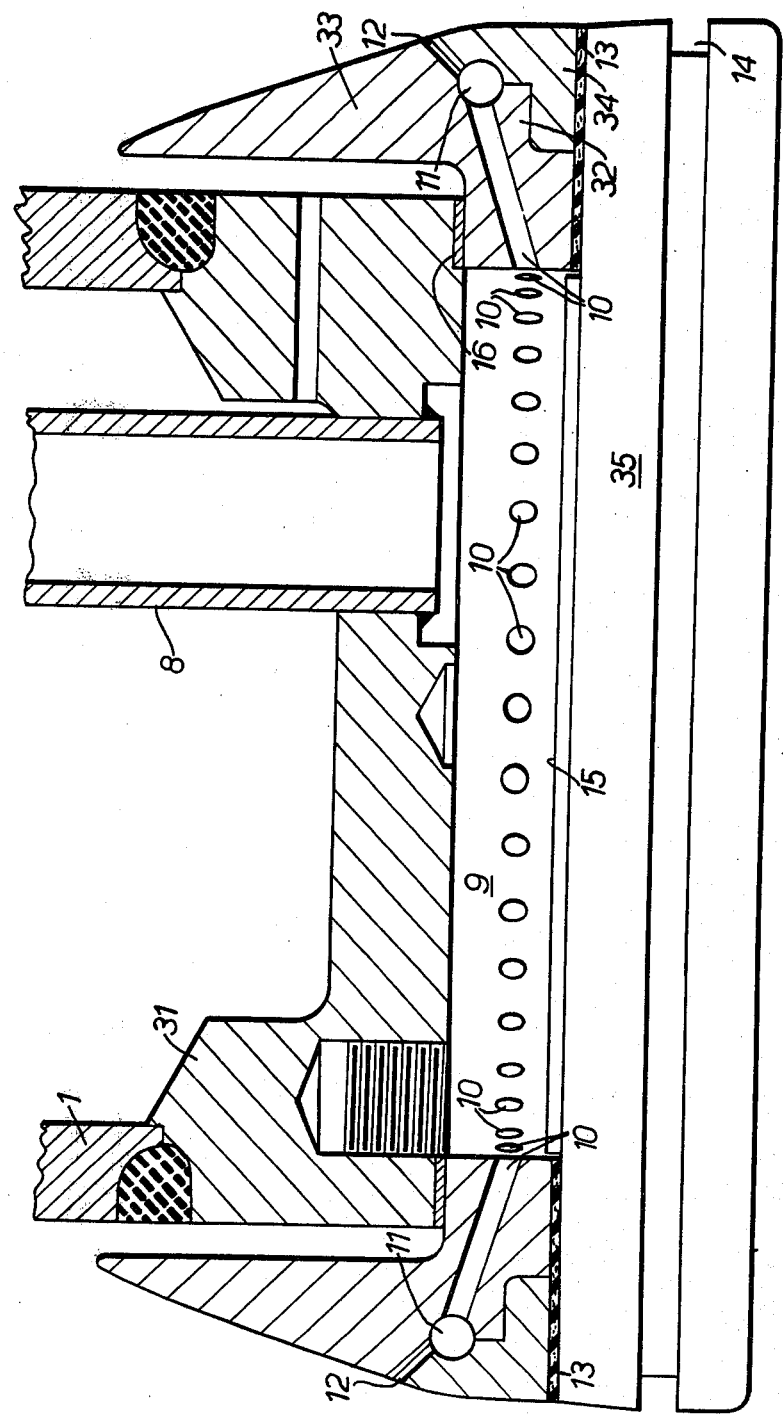

For a better understanding of the invention, and to show more clearly how the same may be carried into effect, reference will now be made, by way of example, to the accompanying drawings in which:

FIG. 1 is a sectional elevation of a tube pressure filter in accordance with the invention, and FIG. 2 is a sectional elevation on a larger scale of the lower end section of the inner tubular body of the tube pressure filter shown in FIG. 1.

The tube pressure filter shown in the drawings comprises an inner tubular body having a central cylindrical section 1, an upper end section 2 and a lower end section 3. It further comprises an outer tubular body 4, an impermeable elastic sleeve 5 secured to the outer tubular body, and a filter element 6 supported on the inner tubular body. The impermeable elastic sleeve defines with the tubular bodies non-intercommunicating inner and outer compartments X and Y respectively. The outer compartment Y is provided with an inlet/outlet 7 for hydraulic fluid under pressure. Referring to FIG. 2, the lower end section 3 of the inner tubular body includes an inner cap 31 which is welded to the end of the cylindrical central section 1, a first ring 32 which includes a portion constituting a fairing 33, a second ring 34 of approximately L-shaped cross-section which fits tightly around an appropriately shaped portion of the ring 32, and an outer cap 35 which is secured to the inner cap 31 by set screws thereby sandwiching the ring 32 between the inner and outer caps. The ring 32 is conveniently made of gun metal and the ring 34 is conveniently made of gun metal or of a synthetic plastics material such as polyurethane. A sealing ring 16 is provided between the inner cap 31 and ring 32. An ante-chamber 9 is defined by inner cap 31, ring 32 and outer cap 35. A feed conduit 8 passes through the inner cap 31 and feed material flows down the conduit 8 and enters the ante-chamber 9 whence it passes through a plurality of ducts 10, toroidal chamber 11 and, finally, through a narrow annular aperture 12 between the fairing 33 and ring 34. The annular aperture 12 is located so that, in use, it is higher than the roof of the ante-chamber 9 (as defined by the inner cap 31). The width of the annular aperture 12 ranges from 0.7 mm to 0.8 mm. A cloth gasket 13 is provided between the outer cap 35 and the rings 32 and 34. The outer cap 35 is provided with a groove 14 to accommodate an O-ring seal for sealing with the outer tubular body 4, and with a central spigot 15 which locates the outer cap 35 within the ring 32 and forms the bottom of ante-chamber 9.

The feed conduit 8 is supplied with feed material through a manifold 40 provided with a threaded nipple 41 to which is secured a non-return valve 20 constructed from a hexagon-section steel rod suitable drilled. A steel ball 21 rests on a seat 22 when the pressure in the manifold is at or near atmospheric pressure but when the pressure in the manifold is raised the ball rises until it comes into contact with the lower end of the threaded stem 23 of a cap 24 which is also manufactured from steel rod of hexagon-section. The stem 23 is provided with stops 25 to accommodate the flow of feed material when the ball is at its highest position. The feed material enters the ante-chamber 9 through feed conduit 8 and when the ball 21 is resting on its seat the column of feed material is suspended in the conduit 8 by the hydraulic lock thus formed and no feed material can leak through the aperture 12.

I claim:

1. In a tube pressure filter which comprises:
   (a) a pair of generally coaxial tubular bodies arranged one within the other and adapted to be supported in a generally upright position;
   (b) an impermeable elastic sleeve disposed within and secured to the outer tubular body;
   (c) a filter element disposed around and supported by the inner tubular body;
   (d) outlet means for the discharge of filtrate which has passed through the filter element; and
   (e) means for displacing the tubular bodies axially relative to one another between first and second positions;
   wherein the arrangement is such that (i) in the first position of said tubular bodies they cooperate with each other to define a closed annular chamber which is divided into generally coaxial and non-intercommunicating inner and outer compartments by said impermeable elastic sleeve, the inner compartment having an inlet for feed material comprising a mixture of a liquid and a particulate solid material and the outer compartment having an inlet for a hydraulic fluid under pressure, and in the second position of said tubular bodies said annular chamber is open to enable particulate solid material to be discharged from the inner compartment, (ii) the inlet of the inner compartment extends around the lower end of the tubular body and debouches into the inner compartment, and (iii) the inlet is in communication with an ante-chamber into which a mixture to be pressure filtered can be introduced under pressure through a feed conduit;
   the improvement wherein said inlet comprises a substantially annular, upwardly inclined passage with an outlet aperture which has a width in the range of from 0.5 to 3.00 mm so that, in use, the feed material debouching from said passage has an upward component of velocity, and said feed conduit has a non-return valve associated therewith for preventing the flow back along the feed conduit of feed material to be pressure filtered which is under high pressure, said ante-chamber having a roof and wherein the outlet aperture of said substantially annular passage being located so that, in use, said outlet is higher than said roof.

2. A tube pressure filter as claimed in claim 1, wherein the outlet aperture of the substantially annular passage has a width which is not larger than 1.25 mm.

3. A tube pressure filter as claimed in claim 1, wherein the substantially annular passage communicates with the ante-chamber by way of a substantially toroidal chamber encircling the ante-chamber and connected thereto by a plurality of ducts.

4. A tube pressure filter as claimed in claim 3, wherein the toroidal chamber is at a lower level than the outlet aperture of said substantially annular passage and the ducts connecting the toroidal chamber with the ante-chamber are inclined downwardly from the toroidal chamber so that the feed material will tend to drain back into the ante-chamber.

5. A tube pressure filter as claimed in claim 4, wherein the sum of the cross-sectional areas of the ducts connecting the toroidal with the ante-chamber is substantially equal to the total cross-sectional area of the outlet aperture of the annular passage.

6. In a tube pressure filter which comprises:
   (a) a pair of generally coaxial tubular bodies arranged one within the other and adapted to be supported in a generally upright position;
   (b) an impermeable elastic sleeve disposed within and secured to the outer tubular body;
   (c) a filter element disposed around and supported by the inner tubular body;
   (d) outlet means for the discharge of filtrate which has passed through the filter element; and
   (e) means for displacing the tubular bodies axially relative to one another between first and second positions; and
   wherein the arrangement is such that (i) in the first position of said tubular bodies they cooperate with each other to define a closed annular chamber which is divided into generally coaxial and non-intercommunicating inner and outer compartments by said impermeable elastic sleeve, the inner compartment having an inlet for feed material comprising a mixture of a liquid and a particulate solid material and the outer compartment having an inlet for a hydraulic fluid under pressure, and in the second position of said tubular bodies said annular chamber is open to enable particulate solid material to be discharged from the inner compartment, (ii) the inlet of the inner compartment extends around the lower end of the tubular body and debouches into the inner compartment, and (iii) the inlet is in communication with an ante-chamber into which a mixture to be pressure filtered can be introduced under pressure through a feed conduit;
   the improvement wherein said inlet comprises a substantially annular, upwardly inclined passage with an outlet aperture which has a width in the range of from 0.5 to 3.0 mm such that, in use, the feed material debouching from said passage has an upward component of velocity; wherein means, comprising a substantially toroidal chamber encircling the ante-chamber and connected thereto by a plurality of ducts, provides communication between said passage and said ante-chamber, the toroidal chamber being at a lower level than the outlet aperture of said substantially annular passage and the plurality of ducts connecting said toroidal chamber with said ante-chamber being inclined downwards from the toroidal chamber; and wherein the feed conduit has a non-return valve associated therewith for preventing flow back along the feed conduit of feed material.

7. A tube pressure filter as claimed in claim 6, wherein the sum of the cross-sectional areas of the ducts connecting the toroidal chamber with the ante-chamber is substantially equal to the total cross-sectional area of the outlet aperature of the annular passage.

* * * * *